UNITED STATES PATENT OFFICE.

BRUNO REICHELT, OF NEWARK, NEW JERSEY, ASSIGNOR TO BETA FERTILIZER CO., OF NEWARK, NEW JERSEY, A CORPORATION OF NEW JERSEY.

FERTILIZER.

1,071,795. Specification of Letters Patent. Patented Sept. 2, 1913.

No Drawing. Application filed April 3, 1911. Serial No. 618,668.

*To all whom it may concern:*

Be it known that I, BRUNO REICHELT, a citizen of the United States, and a resident of Newark, in the county of Essex and State of New Jersey, have invented a new and useful Improvement in Fertilizers; and I do hereby declare the following to be a clear, full, and exact description thereof.

My invention relates to a fertilizer, and has for one of its objects to provide such a fertilizer which will embody properties capable of quickly enriching the roots of crops, vegetables, grass, etc., to insure expeditious growth of the same, while still another object is to provide such a fertilizer which will possess such characteristics that it will not cake or form into lumps, but will retain the condition requisite to prevent clogging of the machinery used in dispensing the same, and thus particularly provide for a "spray like" or powdered feed of the same to the earth or the place where it is used.

In compounding my improved fertilizer, talc rock is employed as a filler, which talc rock contains potash and lime, and the same is deprived of all moisture and ground by suitable machinery into a dry and finely powdered condition. To this crushed or powdered talc is added nitrate of soda, and another nitrogenous compound, such as fish scrap, hoof meal or dried blood which produce ammonia, then phosphate is added, such as acid phosphate, ground phosphate rock or another phosphorous bearing compound, then potash salts are added, such as chlorid of potash or sulfate of potash, or another such salt, and then all of said ingredients are thoroughly mixed in any suitable manner.

Talc is naturally slippery and will thus prevent the adherence of particles or the formation of cakes or lumps in the mixture when all the ingredients of the fertilizer are compounded together, while talc will not only insure the maintenance of the required powdered condition of the mixture, but it will provide for a "spray like" flow of the mixture when discharged or dispensed from the fertilizer machine, and thereby insure an effectual impregnation of all parts of the earth or place over which the fertilizer is distributed.

The quantities of each of the ingredients used in the fertilizer may be varied and some of the ingredients other than the talc may be dispensed with, according to the particular use to which the same is employed.

Practical experience with my improved fertilizer has proven that it has quick action upon the roots of the crop, etc., incident to a high character of enriching properties, and the more it is used year after year, the richer becomes the soil or ground.

What I claim as my invention and desire to secure by Letters Patent is:—

1. A fertilizer comprising crushed talc, a nitrogenous compound, phosphate and potash salts.

2. A fertilizer comprising crushed talc, and potash salts.

3. A fertilizer comprising crushed talc, a nitrogenous compound, and potash salts.

In testimony whereof, I, the said BRUNO REICHELT, have hereunto set my hand.

BRUNO REICHELT.

Witnesses:
WILLIAM HILL,
HENRY JOS. AUTH.